United States Patent [19]
Besson

[11] Patent Number: 6,108,575
[45] Date of Patent: Aug. 22, 2000

[54] HELICAL WEIGHTING ALGORITHMS FOR FAST RECONSTRUCTION

[75] Inventor: Guy M. Besson, Wauwatosa, Wis.

[73] Assignee: General Electric Company, Milwaukee, Wis.

[21] Appl. No.: 09/027,278

[22] Filed: Feb. 20, 1998

[51] Int. Cl.[7] .................................................. A61B 5/05
[52] U.S. Cl. ........................................... 600/425; 378/15
[58] Field of Search .................. 378/4, 15, 19, 378/20, 17, 146; 600/425; 364/413.18

[56] References Cited

U.S. PATENT DOCUMENTS

| | | | |
|---|---|---|---|
| 5,233,518 | 8/1993 | King et al. | 364/413.18 |
| 5,491,735 | 2/1996 | Hsieh | 378/15 |
| 5,515,409 | 5/1996 | Hsieh | 378/15 |
| 5,818,896 | 10/1998 | Hsieh | 378/15 |

*Primary Examiner*—Marvin M. Lateef
*Assistant Examiner*—Ali M. Imam
*Attorney, Agent, or Firm*—Armstrong Teasdale; Christian G. Cabou; Phyllis Y. Price

[57] ABSTRACT

CT helical weighting algorithms wherein one source rotation, or $2\pi$, worth of projection data is utilized for fast image reconstruction are described. Particularly, by using a distance function, and by selecting particular classes of such distance function, the discontinuity across the sinogram can be eliminated. Further, by imposing specific necessary conditions on such distance functions, single analytical expressions across the entire $2\pi$ sinogram are obtained. Decomposition of these particular single distance functions provides exact, or approximated, fast two-filtering reconstruction algorithms, for which a given projection needs to be filtered only two times for an arbitrary number P of reconstruction planes. In addition, single weighting functions that depend only on the sum of the projection and fan angles can be utilized. Accordingly, after rebinning the fan-beam projections to parallel projections, the corresponding $2\pi$ helical weighting algorithms do not include a dependency over the ray parameter (within one parallel projection). For these algorithms, weighting commutes with filtering, and reconstruction of an arbitrary number P of image planes requires only one filtering per projection.

20 Claims, 4 Drawing Sheets

HELICAL WEIGHTING ALGORITHMS FOR FAST RECONSTRUCTION

FIELD OF THE INVENTION

This invention relates generally to computed tomography (CT) imaging and more particularly, to fast reconstruction of images for applications requiring overlapped reconstruction such as biopsy, fluoroscopy, angiography, and three-dimensional model generation.

BACKGROUND OF THE INVENTION

In at least one known CT system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts attenuation measurements from a scan into integers called "CT numbers" or "Hounsfield units", which are used to control the brightness of a corresponding pixel on a cathode ray tube display.

To reduce the total scan time, a "helical" scan may be performed. To perform a "helical" scan, the patient is moved while the data for the prescribed number of slices is acquired. Such a system generates a single helix from a one fan beam helical scan. The helix mapped out by the fan beam yields projection data from which images in each prescribed slice may be reconstructed. Known $2\pi$ helical reconstruction algorithms may generally be classified as Helical Extrapolative (HE) or Helical Interpolative (HI) algorithms. These algorithms typically apply a weighting factor to the projection data in order to reconstruct an image. This weighting factor is generally based on both the fan angle and view angle.

To fully leverage the z-axis resolution of the data and improve image quality of three-dimensional rendition models, overlapped reconstructions (i.e., several reconstructions per rotation) are necessary. In some applications, such as biopsy, it is very desirable to enable reconstruction of several frames per second. Increasing the frame speed facilitates minimizing the amount of contrast medium required and exam time, which decreases risk, discomfort, and dose to the patient. Typically, however, increasing the image frame rate is achieved by increasing the hardware capacity and accepting a reduced image quality. Specifically, $2\pi$ helical weighting algorithms include a fan-angle dependency. The number P of image planes requires K filterings of the projection data, with K=P. Further, known weight distributions present a line of discontinuity across the sinogram, which defines two separate sinogram regions. The weighting functions differ in the regions. Therefore, reconstruction of P different image planes require P weightings and filterings.

It would be desirable to provide reconstruction algorithms that enable fast image reconstruction yet also provide acceptable image quality. It also would be desirable to provide such algorithms that can be practiced without requiring the addition of significant additional hardware to known.

SUMMARY OF THE INVENTION

These and other objects may be attained by CT helical weighting algorithms wherein a distance function is utilized, and by selecting particular classes of such distance function, the discontinuity across the sinogram is eliminated. Further, by imposing specific necessary conditions on such distance functions, single analytical expressions across the entire $2\pi$ sinogram are obtained. Decomposition of these particular single distance functions enables exact, or approximated, fast two-filtering reconstruction algorithms, for which a given projection needs to be filtered only two times for an arbitrary number P of reconstruction planes.

In addition, single weighting functions that depend only on the sum of the projection and fan angles can be utilized. Accordingly, after rebinning the fan-beam projections to parallel projections, the corresponding $2\pi$ helical weighting algorithms do not include a dependency over the ray parameter (within one parallel projection). For these algorithms, weighting commutes with filtering, and reconstruction of an arbitrary number P of image planes requires only one filtering per projection.

The above described helical weighting facilitates implementation of reconstruction algorithms that enable fast image reconstruction yet also provide acceptable image quality. Such algorithms also can be practiced without requiring the addition of significant additional hardware to known.

DETAILED DESCRIPTION

Figure 1:
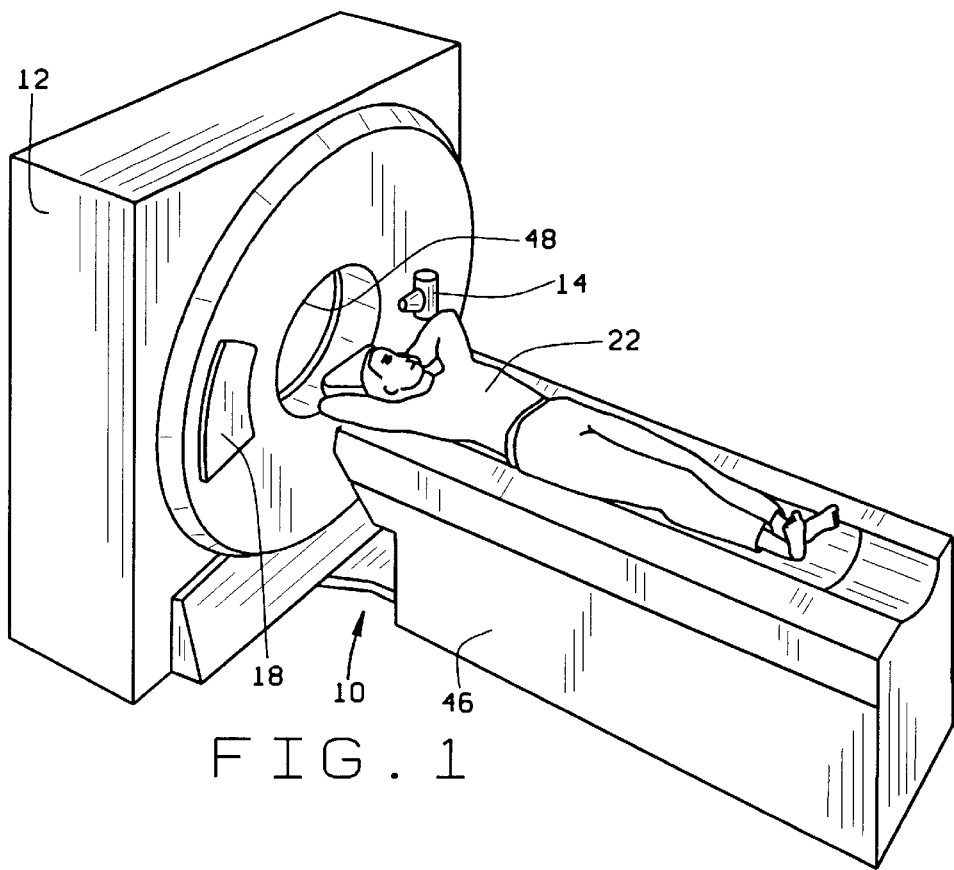
FIG. 1 is a pictorial view of a CT imaging system.
Figure 2:
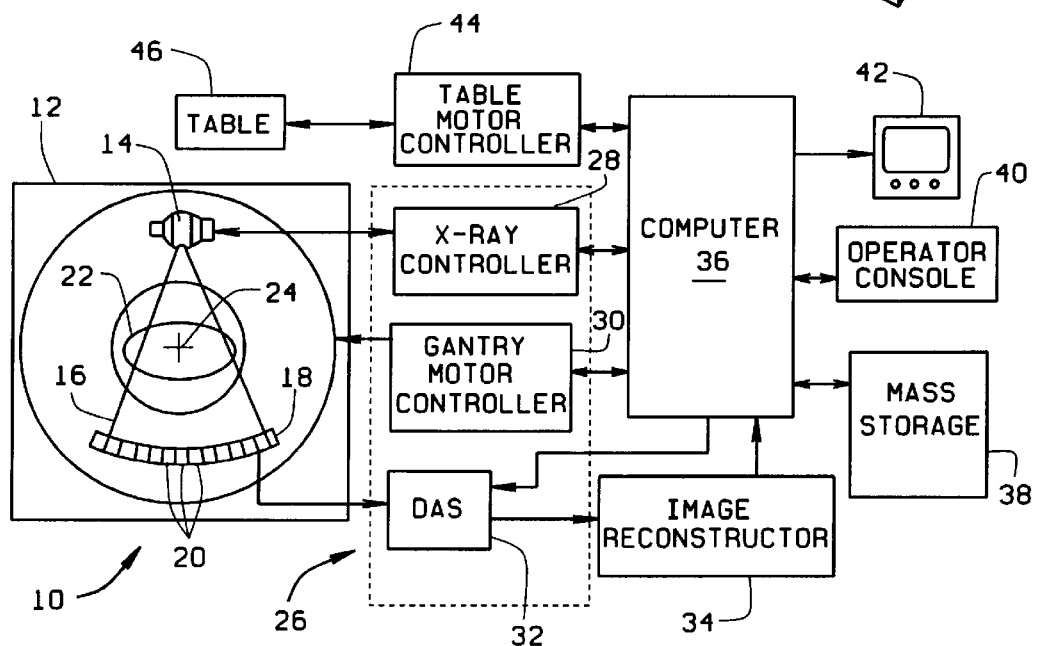
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through a medical patient 22. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

The known $2\pi$ helical reconstruction algorithms may generally be classified as Helical Extrapolative (HE) and Helical Interpolative (HI) algorithms. These algorithms typically apply a weighting factor to the projection data in order to reconstruct an image. This weighting factor is generally based on both the fan angle and view angle.

Figure 3:
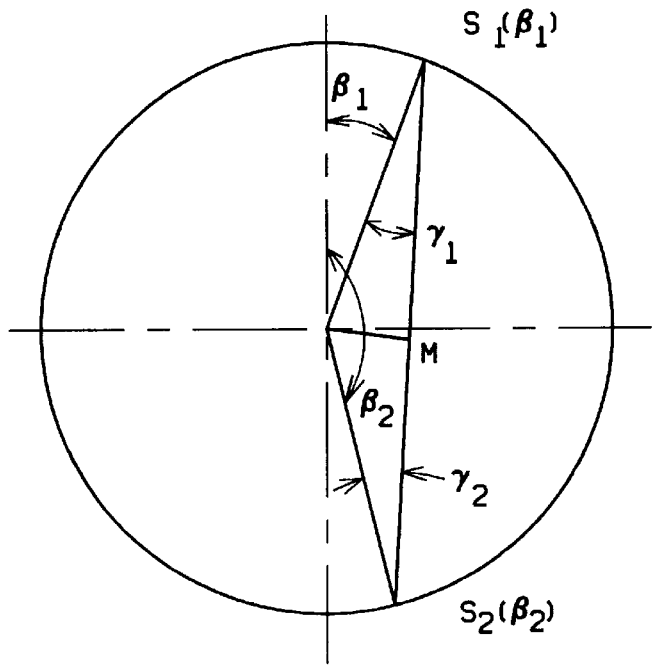
FIG. 3 illustrates fan beam parameters and associated Radon space sampling.

Described below are helical weighting algorithms which enable fast image reconstruction with acceptable image quality. More particularly, let f be the function to be reconstructed, and Rf be its Radon transform as shown in FIG. 3. It is well known that a $2\pi$ data acquisition (i.e., source angle rotation of 360 degrees) provides a data set where each Radon space point has been sampled exactly twice, neglecting the effect of quarter offset. To construct a single image, weights $w_1$ and $w_2$ are sought such that:

$$Rf(\beta,\gamma)=w_1 Rf(\beta_1,\gamma_1)+w_2 Rf(\beta_2,\gamma_2)$$

defines the Radon transform of the slice to be reconstructed with the minimum artifacts, best slice profile and noise characteristics. It is customary to impose:

$$w_1+w_2=1.0$$

as each Radon transform point should be equally weighted prior to filtering and backprojection. It is well known that $Rf_1$ and $Rf_2$ fan-beam coordinates are related through:

$$\beta_2=\beta_1\pi+2\gamma_1$$
$$\gamma_2=-\gamma_1$$

With $Rf_1$ and $Rf_2$ having been acquired at different times, however, such coordinates might differ due, for example, to quarter offset, patient motion, patient table motion, and system drift.

Current helical weighting algorithms are based on a polynomial interpolation/extrapolation approach, usually linear. In the algorithms described below in more detail, a given point in Radon space (or projection ray) contributes to the reconstructed image as a function of the distance from the ray to the reconstruction plane. As used herein, the term "distance" is not limited to the strict mathematical definition. In the discussion below, three classes of $2\pi$ algorithms are considered. Particularly, helical extrapolation and helical interpolation, as modified in accordance with the present invention, are discussed. In addition, a new class of algorithms, denoted "SHE" is described.

Helical Extrapolative

Figure 4:
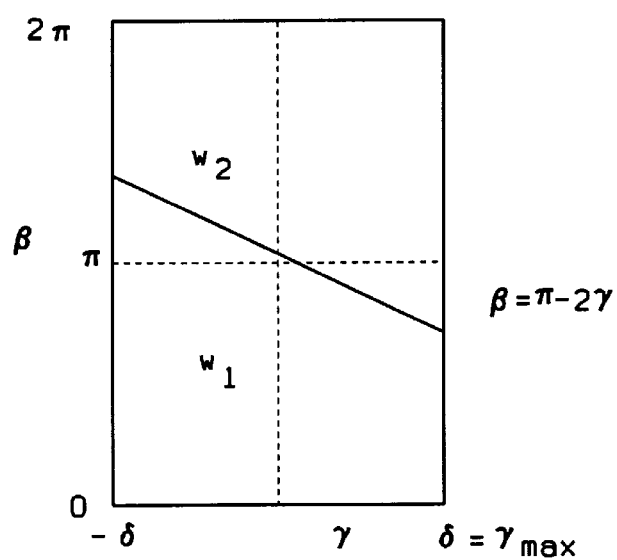
FIG. 4 illustrates fan-beam projection data and helical extrapolative weighting.
Figure 5:
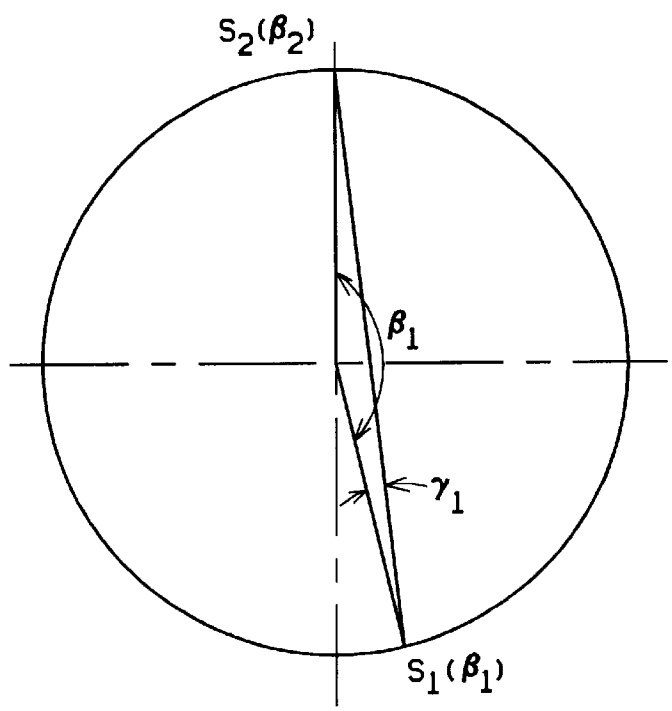
FIG. 5 illustrates operation of a helical extrapolative algorithm.
Figure 6:
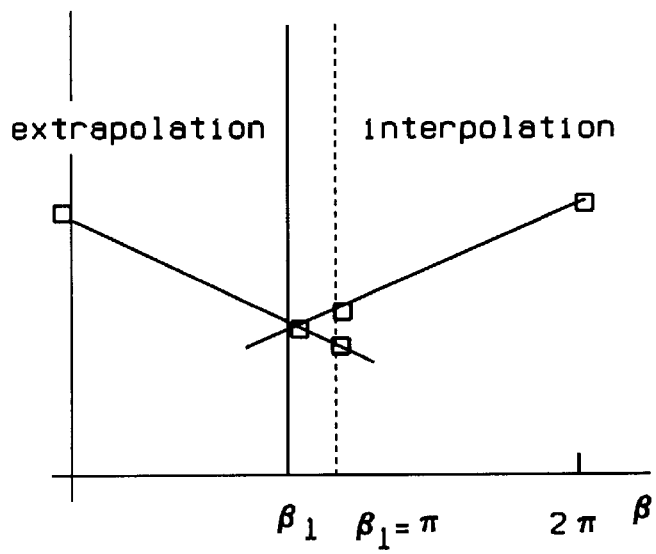
FIG. 6 illustrates the weighting discontinuity as the fan angle increases.

With respect to Helical Extrapolative (HE) algorithms, FIG. 4 is a sinogram representation of the projection data and the line $\beta=\pi-2\gamma$. As shown in FIGS. 5 and 6, there is a discontinuity along the line $\beta=\pi-2\gamma$, and the weight function changes when crossing this line. Algorithms using $w_1 \neq w_2$ do not lend themselves to fast reconstruction applications since all the views in the range a $\beta=\pi-2\gamma$, $\delta \leq \gamma \leq \delta$ require re-filtering when the z-location of the plane to be reconstructed changes.

Reconstruction at a plane at, $\beta=\pi$ is sought:

$$Rf(\pi,\gamma)=w_1 Rf(\beta_1,\gamma_1)+w_2 Rf(\beta_2,\gamma_2)$$

with the weights being defined by the respective distances of the rays to the plane of reconstruction (POR) and normalized to sum to 1.0:

$$\left\{1-\frac{d(\beta_1,\pi)}{d(\beta_1,\pi)+d(\pi,\beta_2)}\right\}Rf(\beta_1,\gamma_1)+$$

$$\left\{1-\frac{d(\pi,\beta_2)}{d(\beta_1,\pi)+d(\pi,\beta_2)}\right\}Rf(\beta_2,\gamma_2).$$

Rewriting each weight in the coordinates of the associated ray leads to:

$$w_1(\beta,\gamma)=\frac{d(0,\beta+2\gamma)}{d(\beta,\pi)+d(0,\beta+2\gamma)}; 0 \leq \beta \leq \pi-2\gamma$$

$$w_2(\beta,\gamma)=\frac{d(\beta+2\gamma,2\pi)}{d(\pi,\beta,)+d(\beta+2\gamma,2\pi)}; \pi-2\gamma \leq \beta \leq 2\pi$$

By selecting d: $d(xy)=y-x$, the weights are discontinuous along the line $\beta=\pi-2\gamma$ except for $\gamma=0$. Accordingly, feathering is required, since reconstruction filtering takes place along gamma. Also, some of the weights are negative, which leads to higher noise in the reconstructed images.

Ensuring $d(x,y)=d(y,x)$ leads to continuous weights along the line $\beta=\pi-2\gamma$. One way to achieve this and also obtain weights that are positive everywhere is to choose: $d(x,y)=|y-x|$:

$$w_1(\beta,\gamma)=\frac{|\beta+2\gamma|}{|\pi-\beta|+|\beta+2\gamma|}; 0 \leq \beta \leq \pi-2\gamma$$

$$w_2(\beta,\gamma)=\frac{|2\pi-\beta-2\gamma|}{|\pi-\beta|+|2\pi-\beta-2\gamma|}; \pi-2\gamma \leq \beta \leq 2\pi$$

A fast reconstruction algorithm is obtained if a given projection does not need to be re-filtered (after application of the helical weights) or if it could be filtered only a limited number of times (for example, two filterings for any number of reconstruction, such as six per rotation). If the weights are not dependent upon the fan-angle $\gamma$, filtering of each view is required only once.

If $w_1$ is different from $w_2$, re-filtering of all the views in the range $[\pi-2\delta, \pi+2\delta]$ is necessary for reconstruction at a different z-index location. A weighting function is referred to herein as a Mono-type, or M-type, if the weights are given by a single function w across the range of source angle $\beta$. A weight function which can be decomposed as:

$$w(\beta,\gamma) = A(\beta) + B(\beta) \times C(\gamma), \text{ or more generally as:}$$

$$w(\beta,\gamma) = A_0(\beta)C_0(\gamma) + A_1(\beta)C_1(\gamma) + \cdots + A_{K-1}(\beta)C_{K-1}(\gamma)$$

is referred to herein as a D-type function. Further, some functions will be exactly D-type (DE) while some other will be approximately D-type (DA). A function that is both of M-type and DE-type lends itself to fast reconstruction applications since the linearity of the filtering operation for a given projection $p(\gamma)$ needs to be filtered only twice, as $p(\gamma)$ and $p(\gamma) \times C(\gamma)$.

From the HEG weighting expression above, it is clear that HEG is M-type for any function d such that:

$$d(x,y) = d(y,x) \; (C\text{-}1) \text{ and } d(x,2\pi) = d(x,0) \; (C\text{-}2).$$

In the HEG algorithm, the difference in argument is always less than $\pi$. So:

$$d(x, y) = \sin^2\left(\frac{y-x}{2}\right).$$

is monotonic increasing over the range of arguments and satisfies both conditions (C-1) and (C-2) to define an M-weight function:

$$w(\beta, \gamma) = \frac{\sin^2(\beta/2 + \gamma)}{\cos^2(\beta/2) + \sin^2(\beta/2 + \gamma)}.$$

Assuming that the weight function w is of type M ($w_1 = w_2$), and writing:

$$w(\beta,\gamma) = A(\beta) + B(\beta) \times C(\gamma)$$

leads to the following:

$$w(\beta, 0) = \frac{d(0, \beta)}{[d(\beta, \pi) + d(0, \beta)]} = A(\beta) + B(\beta) \times C(0)$$

$$C(\gamma) - C(0) = \frac{d(\beta, \pi)}{B(\beta)[d(\beta, \pi) + d(0, \beta)]} \times \left\{ \frac{d(0, \beta+2\gamma) - d(0, \beta)}{d(\beta, \pi) + d(0, \beta+2\gamma)} \right\}$$

As explained above, HEG with $d(x,y) = \sin^2((y-x)/2)$ is type M. Based on the two equations above, the following "two filtering" approximation is obtained:

$$w(\beta, \gamma) \approx \sin^2\left(\frac{\beta}{2}\right) + \cos^2\left(\frac{\beta}{2}\right)\sin(\beta)\gamma + O(\gamma^2)$$

Using $w_1$ and $w_2$ expressions from above, the associated function is of type M, with w given by:

$$w(\beta, \gamma) = \frac{\tan\left(\frac{\beta}{2} + \gamma\right)}{\tan\left(\frac{\pi}{2} - \frac{\beta}{2}\right) + \tan\left(\frac{\beta}{2} + \gamma\right)}$$

Accordingly:

$$w(\beta, \gamma) = \frac{\tan\left(\frac{\beta}{2}\right)\tan\left(\frac{\beta}{2} + \gamma\right)}{1 + \tan\left(\frac{\beta}{2}\right)\tan\left(\frac{\beta}{2} + \gamma\right)} = \sin^2\left(\frac{\beta}{2}\right) + \frac{1}{2}\sin(\beta)\tan(\gamma)$$

This is an exact 2-filtering decomposition of the weight function. It is clear from the expression above that the weights go to zero for both lines $\beta=0$ and $\beta=2\pi$. The sign of the coefficient for the function $c(\gamma)=\tan(\gamma)$ changes at $\beta=\pi$.

Helical Interpolative

Set forth below is a description of a helical interpolative $2\pi$ algorithm. The region of reconstruction with respect to the line $\beta=\pi-2\gamma$ leads to:

$$w_1(\beta, \gamma) = \frac{d(0, \beta)}{d(\beta, \pi - 2\gamma) + d(0, \beta)}; 0 \le \beta \le \pi - 2\gamma$$

$$w_2(\beta, \gamma) = \frac{d(\beta, 2\pi)}{d(\pi - 2\gamma, \beta) + d(\beta, 2\pi)}; \pi - 2\gamma \le \beta \le 2\pi$$

By selecting d: $d(x,y) = y-x$, the helical interpolative algorithm is obtained. The weights are continuous along the line $\beta=\pi-2\gamma$. However, the first derivative is discontinuous. The same results would be obtained with $d(x,y) = |y-x|$. The weights are positive everywhere, thus leading to better noise performance than helical extrapolative. There are, of course, many functions d( ) that exhibit the same property.

The selection of $d(x,y) = |\sin((y-x)/2)|$ leads to the following M-type weight expression and 2-filtering decomposition:

$$w(\beta, \gamma) = \frac{\sin(\beta/2)}{|\cos(\beta/2 + \gamma)| + \sin(\beta/2)}.$$

Note that $d(x,y) = \sin((y-x)/2)$ does not lead to an M-weight function.

The selection of $d(x,y) = \tan(y-x)/2)$ leads to the following weight expression and decomposition:

$$w(\beta, \gamma) = \frac{\tan\left(\frac{\beta}{2}\right)\tan\left(\frac{\beta}{2} + \gamma\right)}{1 + \tan\left(\frac{\beta}{2}\right)\tan\left(\frac{\beta}{2} + \gamma\right)} = \sin^2\left(\frac{\beta}{2}\right) + \frac{1}{2}\sin(\beta)\tan(\gamma)$$

For this function choice, the HIG algorithm coincides with the HEG algorithm (for the same distance function), and leads to an exact two-filtering weight decomposition. Other distance choices, such as $d(x,y) = \text{atan}[\tan(y-x)/2]$, are possible.

Single-Filtering Helical

Generally, in the single-filtering helical algorithm (SHE), a ray is weighted according to the parameter value (source angle) assigned to the same ray belonging to a parallel projection. With $\theta$ denoting the source angle of the associated parallel projection:

$$\left\{1 - \frac{d(\theta_1, \pi)}{d(\theta_1, \pi) + d(\pi, \theta_2)}\right\} Rf(\beta_1, \gamma_1) +$$

$$\left\{1 - \frac{d(\pi, \theta_2)}{d(\theta_1, \pi) + d(\pi, \theta_2)}\right\} Rf(\beta_2, \gamma_2)$$

It is possible to specify:

$$w_1 + w_2 = w(\theta).$$

Since $\theta = \beta + \gamma$, the weighting functions are given by:

$$w_1(\beta, \gamma) = \frac{d(0, \beta + \gamma)}{d(\beta + \gamma, \pi) + d(0, \beta + \gamma)}; 0 \le \beta \le \pi - \gamma$$

$$w_2(\beta, \gamma) = \frac{d(\beta + \gamma, 2\pi)}{d(\pi, \beta + \gamma) + d(\beta + \gamma, 2\pi)}; \pi - \gamma \le \beta \le 2\pi$$

Note the symmetry in the SHEG weight expression.

By selecting $d(x,y) = y - x$:

$$w_1(\beta, \gamma) = \frac{\beta + \gamma}{\pi}; 0 \le \beta \le \pi - \gamma$$

$$w_2(\beta, \gamma) = \frac{2\pi - \beta - \gamma}{\pi} = 2 - w_1(\beta, \gamma); \pi - \gamma \le \beta \le 2\pi$$

By selecting the following function d: $d(x,y) = \sin^2((y-x)/2)$, the following M-type and D-type 3-filtering algorithm is obtained:

$$w(\beta, \gamma) = \sin^2\left(\frac{\beta + \gamma}{2}\right) = \sin^2\left(\frac{\beta}{2}\right) + \frac{1}{2}\sin(\beta)\sin(\gamma) + \cos(\beta)\sin^2\left(\frac{\gamma}{2}\right)$$

The decomposition is an exact 3-filtering. It can be approximated by a 2-filtering function:

$$w(\beta, \gamma) = \sin^2\left(\frac{\beta + \gamma}{2}\right) = \sin^2\left(\frac{\beta}{2}\right) + \frac{1}{2}\sin(\beta)\sin(\gamma)$$

By using the distance function $d(x,y) = tg(y-2)/2)$, the same results are obtained.

By selecting the following function d: $d(x,y) = |\sin(y-x)/2|^\delta$, the following type M SHEG algorithm is obtained:

$$w(\beta, \gamma) = \frac{\left|\sin\left(\frac{\beta + \gamma}{2}\right)\right|^\delta}{\left|\cos\left(\frac{\beta + \gamma}{2}\right)\right|^\delta + \left|\sin\left(\frac{\beta + \gamma}{2}\right)\right|^\delta}$$

As the associated image quality is particularly promising, the noise power for this algorithm was calculated:

$$N(\gamma) = \int_0^{2\pi} w^2(\beta, \gamma) d\beta = \frac{1}{2}\int_0^{2\pi} \frac{1 - \cos(\beta + \gamma)}{1 + |\sin(\beta + \gamma)|} d\beta$$

Accordingly $N(\gamma)$ is independent of $\gamma$ and:

$$N(0) = \int_0^{\pi} \frac{d\beta}{1 + \sin(\beta)} = 2.0$$

Figure 7:
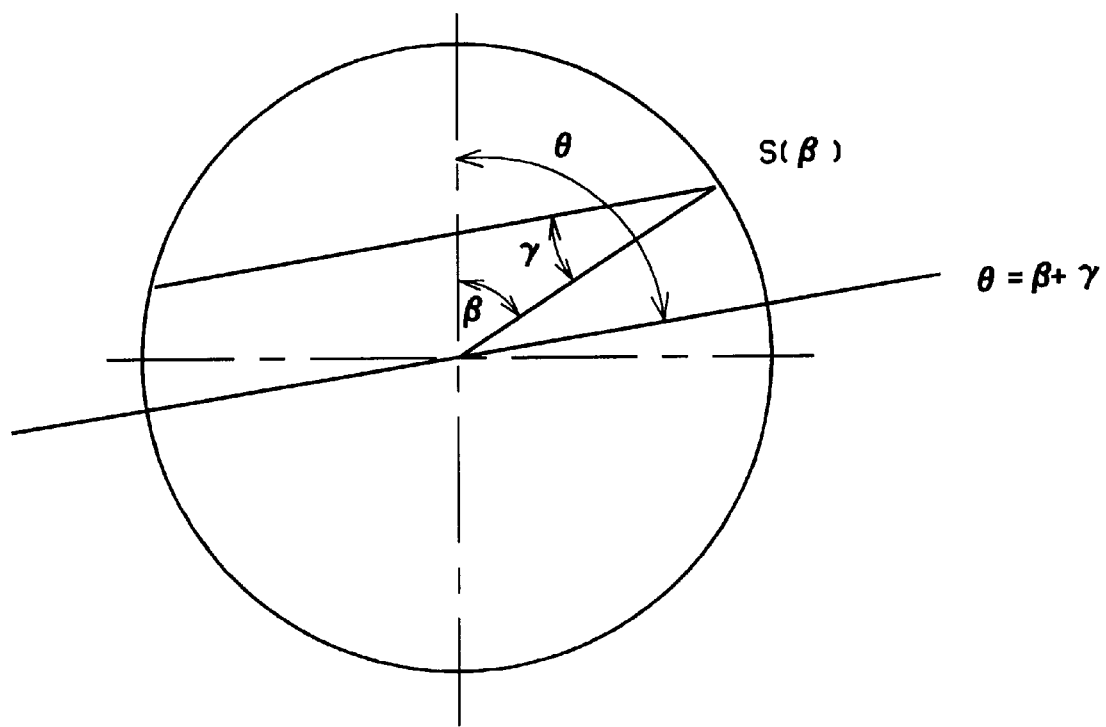
FIG. 7 illustrates fan beam and parallel projection coordinates.

Referring to FIG. 7, it is clear that:

$$\theta = \beta + \gamma$$

and accordingly, after rebinning onto $2\pi$ of views, the weights are not a function of the channel index along the parallel view, but are only a function of the parallel view angle. Accordingly, the weight can be factorized out of the reconstruction filtering operations, and applied after filtering, at or prior to the backprojection state. An arbitrary number of image planes can therefore be reconstructed without re-filtering, thus yielding fast $2\pi$ helical weighting algorithm with the no apparent image quality penalty and excellent noise performance.

The "distance" approach to helical weighting described above can be generalized. Applications to data sets comprising $n\pi$ ($n \ge 2$) of data is straightforward. For instance, it is possible to define a general class of $3\pi$ POR and ROR algorithms. The "distance" approach also applies to multi-slice scanners.

The above described helical weighting algorithms facilitate implementation of reconstruction algorithms that enable fast image reconstruction yet also provide acceptable image quality. Such algorithms also can be practiced without requiring the addition of significant additional hardware to known. In particular, SHE algorithms provide 1-filtering algorithms with acceptable image quality, noise power, and artifacts.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

I claim:

1. A system for producing a tomographic image of an object from projection data acquired in a helical scan, said system comprising an image reconstructor system configured to generate helical weighting factors based on a distance function, said distance function based upon a given point in Radon space contributing to the tomographic image as a function of distance from a projection ray to a reconstruction plane.

2. A system in accordance with claim 1 wherein said helical weighting factors are generated using a single weighting function.

3. A system in accordance with claim 1 wherein said image reconstructor system is configured to execute a generalized helical extrapolative algorithm.

4. A system in accordance with claim 1 wherein said image reconstructor system is configured to execute a generalized helical interpolative algorithm.

5. A system in accordance with claim 1 wherein said image reconstructor system is configured to execute a generalized single-filtering helical algorithm.

6. A system in accordance with claim 1 wherein said helical weighting factors are generated in accordance with:

$$w(\beta, \gamma) = \frac{\tan\left(\frac{\beta}{2}\right)\tan\left(\frac{\beta}{2} + \gamma\right)}{1 + \tan\left(\frac{\beta}{2}\right)\tan\left(\frac{\beta}{2} + \gamma\right)} = \sin^2\left(\frac{\beta}{2}\right) + \frac{1}{2}\sin(\beta)\tan(\gamma)$$

7. A system in accordance with claim 1 wherein said helical weighting factors are generated in accordance with:

$$w_1(\beta, \gamma) = \frac{d(0, \beta)}{d(\beta, \pi - 2\gamma) + d(0, \beta)}; 0 \le \beta \le \pi - 2\gamma$$

$$w_2(\beta, \gamma) = \frac{d(\beta, 2\pi)}{d(\pi - 2\gamma, \beta) + d(\beta, 2\pi)}; \pi - 2\gamma \le \beta \le 2\pi$$

where $d(x,y) = y - x$.

8. A system in accordance with claim 1 wherein said helical weighting factors are generated in accordance with:

$$w(\beta, \gamma) = \frac{\sin(\beta/2)}{|\cos(\beta/2+\gamma)| + \sin(\beta/2)}.$$

9. A system in accordance with claim 1 wherein said helical weighting factors are generated in accordance with:

$$w_1(\beta, \gamma) = \frac{d(0, \beta+\gamma)}{d(\beta+\gamma, \pi) + d(0, \beta+\gamma)}; 0 \le \beta \le \pi - \gamma$$

$$w_2(\beta, \gamma) = \frac{d(\beta+\gamma, 2\pi)}{d(\pi, \beta+\gamma) + d(\beta+\gamma, 2\pi)}; \pi - \gamma \le \beta \le 2\pi$$

where β denotes the source angle.

10. A system in accordance with claim 9 wherein d(x,y) is selected to equal y−x and:

$$w_1(\beta, \gamma) = \frac{\beta+\gamma}{\pi}; 0 \le \beta \le \pi - \gamma$$

$$w_2(\beta, \gamma) = \frac{2\pi - \beta - \gamma}{\pi} = 2 - w_1(\beta, \gamma); \pi - \gamma \le \beta \le 2\pi$$

11. A system in accordance with claim 9 wherein d(x,y) is selected to equal $\sin^2((y-x)/2)$ and $$w(\beta, \gamma) = \sin^2\left(\frac{\beta+\gamma}{2}\right) = \sin^2\left(\frac{\beta}{2}\right) + \frac{1}{2}\sin(\beta)\sin(\gamma) + \cos(\beta)\sin^2\left(\frac{\gamma}{2}\right)$$

12. A system in accordance with claim 9 wherein:

$$w(\beta, \gamma) = \sin^2\left(\frac{\beta+\gamma}{2}\right) = \sin^2\left(\frac{\beta}{2}\right) + \frac{1}{2}\sin(\beta)\sin(\gamma)$$

13. A system in accordance with claim 9 wherein d(x,y) is selected to equal $|\sin(y-x)/2|^\delta$ and:

$$w(\beta, \gamma) = \frac{\left|\sin\left(\frac{\beta+\gamma}{2}\right)\right|^\delta}{\left|\cos\left(\frac{\beta+\gamma}{2}\right)\right|^\delta + \left|\sin\left(\frac{\beta+\gamma}{2}\right)\right|^\delta}$$

14. A system in accordance with claim 1 wherein said image reconstructuor system enables reconstructor of an arbitrary number of image planes from two filterings of the projection data.

15. A system in accordance with claim 1 wherein said image reconstructor system enables reconstruction of an arbitrary number of image planes from one filtering of the projection data.

16. A system for producing a tomographic image of an object from projection data acquired in a helical scan, said system comprising an image reconstructor system configured to generate helical weighting factor based on a distance function, said helical weighting factor generated in accordance with:

$$w_1 + w_2 = w(\theta).$$

where θ=β+γ.

17. A system in accordance with claim 16 wherein said helical weighting factors are generated in accordance with:

$$w_1(\beta, \gamma) = \frac{d(0, \beta+\gamma)}{d(\beta+\gamma, \pi) + d(0, \beta+\gamma)}; 0 \le \beta \le \pi - \gamma$$

$$w_2(\beta, \gamma) = \frac{d(\beta+\gamma, 2\pi)}{d(\pi, \beta+\gamma) + d(\beta+\gamma, 2\pi)}; \pi - \gamma \le \beta \le 2\pi$$

where β denotes the source angle.

18. A system in accordance with claim 17 wherein d(x,y) is selected to equal y−x and:

$$w_1(\beta, \gamma) = \frac{\beta+\gamma}{\pi}; 0 \le \beta \le \pi - \gamma$$

$$w_2(\beta, \gamma) = \frac{2\pi - \beta - \gamma}{\pi} = 2 - w_1(\beta, \gamma); \pi - \gamma \le \beta \le 2\pi$$

19. A system in accordance with claim 16 wherein:

$$w(\beta, \gamma) = \sin^2\left(\frac{\beta+\gamma}{2}\right) = \sin^2\left(\frac{\beta}{2}\right) + \frac{1}{2}\sin(\beta)\sin(\gamma)$$

20. A system in accordance with claim 16 wherein d(x,y) is selected to equal $|\sin(y-x)/2|^\delta$ and:

$$w(\beta, \gamma) = \frac{\left|\sin\left(\frac{\beta+\gamma}{2}\right)\right|^\delta}{\left|\cos\left(\frac{\beta+\gamma}{2}\right)\right|^\delta + \left|\sin\left(\frac{\beta+\gamma}{2}\right)\right|^\delta}$$

* * * * *